(12) United States Patent
Arbore et al.

(10) Patent No.: US 10,718,931 B2
(45) Date of Patent: Jul. 21, 2020

(54) CONFOCAL INSPECTION SYSTEM HAVING AVERAGED ILLUMINATION AND AVERAGED COLLECTION PATHS

(71) Applicant: Apple Inc., Cupertino, CA (US)

(72) Inventors: Mark Alan Arbore, Los Altos, CA (US); Matthew A. Terrel, Campbell, CA (US); Edward L. Hull, Los Altos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/529,451

(22) PCT Filed: Dec. 22, 2015

(86) PCT No.: PCT/US2015/067480
§ 371 (c)(1),
(2) Date: May 24, 2017

(87) PCT Pub. No.: WO2016/106368
PCT Pub. Date: Jun. 30, 2016

(65) Prior Publication Data
US 2018/0039055 A1 Feb. 8, 2018

Related U.S. Application Data

(60) Provisional application No. 62/096,282, filed on Dec. 23, 2014.

(51) Int. Cl.
*G02B 21/00* (2006.01)
*G01N 21/47* (2006.01)
*G01N 21/55* (2014.01)

(52) U.S. Cl.
CPC ......... *G02B 21/0016* (2013.01); *G01N 21/47* (2013.01); *G01N 21/55* (2013.01);
(Continued)

(58) Field of Classification Search
None
See application file for complete search history.

(56) References Cited

U.S. PATENT DOCUMENTS 3,013,467 A * 12/1961 Minsky ............... G02B 21/002
356/432
4,260,263 A 4/1981 Kummer
(Continued)

FOREIGN PATENT DOCUMENTS

CN 101622566 A 1/2010
CN 102472664 5/2012
(Continued)

OTHER PUBLICATIONS

Aguirre, A. D. et al. (Feb. 17, 2010). "High speed optical coherence microscopy with autofocus adjustment and a miniaturized endoscopic imaging probe," Optical Society of America, vol. 18, No. 5, Retrieved from the Internet: URL:http://www.ncbi.nlm.nih.gov/pmc/articles/PMC2908909/pdf/oe-18-5-4222.pdf, retrieved on Oct. 31, 2014, figures 1, 7, p. 4226-4235.
(Continued)

*Primary Examiner* — Dominic J Bologna
*Assistant Examiner* — Jarreas C Underwood
(74) *Attorney, Agent, or Firm* — Brownstein Hyatt Farber Schreck, LLP

(57) ABSTRACT

A confocal inspection system can optically characterize a sample. An objective lens, or separate incident and return lenses, can deliver incident light from a light source to the sample, and can collect light from the sample. Confocal optics can direct the collected light onto a detector. The system can average the incident light over multiple locations at the sample, for example, by scanning the incident light with a pivotable mirror in the incident and return optical paths, or by illuminating and collecting with multiple spaced-apart confocal apertures. The system can average the
(Continued)

collected light, for example, by directing the collected light onto a single-pixel detector, or by directing the collected light onto a multi-pixel detector and averaging the pixel output signals to form a single electronic signal. Averaging the incident and/or return light can be advantageous for structured or inhomogeneous samples.

15 Claims, 16 Drawing Sheets

(52) U.S. Cl.
CPC ....... *G02B 21/008* (2013.01); *G02B 21/0032* (2013.01); *G02B 21/0052* (2013.01); *G01N 2201/068* (2013.01); *G01N 2201/0638* (2013.01)

(56) References Cited

U.S. PATENT DOCUMENTS

| | | | |
|---|---|---|---|
| 4,300,167 A | 11/1981 | Miller | |
| 4,810,077 A | 3/1989 | Sting | |
| 4,827,125 A * | 5/1989 | Goldstein | G02B 21/0036 250/216 |
| 4,956,796 A | 9/1990 | Rogers | |
| 4,975,581 A | 12/1990 | Robinson et al. | |
| 5,065,008 A * | 11/1991 | Hakamata | G02B 21/0032 250/216 |
| 5,220,403 A | 6/1993 | Batchelder | |
| 5,475,235 A | 12/1995 | Phillips et al. | |
| 5,483,261 A | 1/1996 | Yasutake | |
| 5,488,204 A | 1/1996 | Mead et al. | |
| 5,737,078 A | 4/1998 | Takarada | |
| 5,818,629 A | 10/1998 | Kinoshita | |
| 5,825,352 A | 10/1998 | Bisset et al. | |
| 5,835,079 A | 11/1998 | Shieh | |
| 5,880,411 A | 3/1999 | Gillespie et al. | |
| 5,936,739 A | 8/1999 | Cameron et al. | |
| 5,946,100 A * | 8/1999 | Ishihara | G01B 11/24 356/608 |
| 6,122,042 A * | 9/2000 | Wunderman | A61B 1/05 356/343 |
| 6,188,391 B1 | 2/2001 | Seely et al. | |
| 6,198,531 B1 | 3/2001 | Nielsen | |
| 6,236,459 B1 | 5/2001 | Negandaripour | |
| 6,248,988 B1 * | 6/2001 | Krantz | G02B 21/004 250/201.3 |
| 6,310,610 B1 | 10/2001 | Beaton et al. | |
| 6,323,846 B1 | 11/2001 | Westerman et al. | |
| 6,353,226 B1 * | 3/2002 | Khalil | A61B 5/14532 250/339.11 |
| 6,424,416 B1 | 7/2002 | Gross et al. | |
| 6,519,033 B1 | 2/2003 | Quist et al. | |
| 6,587,703 B2 * | 7/2003 | Cheng | A61B 5/14546 600/310 |
| 6,690,387 B2 | 2/2004 | Zimmerman et al. | |
| 6,794,658 B2 * | 9/2004 | MacAulay | G01N 21/253 250/458.1 |
| 6,999,183 B2 | 2/2006 | Nielsen et al. | |
| 7,015,894 B2 | 3/2006 | Morohoshi | |
| 7,075,046 B2 * | 7/2006 | Kennedy | G02B 21/245 250/201.2 |
| 7,170,598 B2 * | 1/2007 | Walla | G01J 3/4406 250/458.1 |
| 7,184,064 B2 | 2/2007 | Zimmerman et al. | |
| 7,282,723 B2 | 10/2007 | Schomacker et al. | |
| 7,372,985 B2 * | 5/2008 | So | G06K 9/00127 382/133 |
| 7,433,042 B1 | 10/2008 | Cavanaugh et al. | |
| 7,440,659 B2 * | 10/2008 | Liu | A61B 5/0059 385/15 |
| 7,460,248 B2 * | 12/2008 | Kurtz | A61B 5/0059 356/495 |
| 7,495,768 B2 | 2/2009 | Mori et al. | |
| 7,663,607 B2 | 2/2010 | Hotelling et al. | |
| 7,720,291 B2 | 5/2010 | Trifonov et al. | |
| 8,040,495 B2 * | 10/2011 | Hendriks | A61B 5/0068 356/337 |
| 8,102,530 B2 | 1/2012 | Sperling | |
| 8,140,147 B2 * | 3/2012 | Maynard | A61B 5/0071 600/316 |
| 8,479,122 B2 | 7/2013 | Hotelling et al. | |
| 8,518,643 B2 | 8/2013 | Rank et al. | |
| 8,547,535 B2 * | 10/2013 | Tezuka | A61B 5/14532 250/201.3 |
| 8,619,237 B2 * | 12/2013 | Hillman | G01N 21/4795 356/2 |
| 8,634,072 B2 | 1/2014 | Trainer | |
| 8,866,107 B2 * | 10/2014 | Cui | G01N 21/49 250/252.1 |
| 8,958,858 B2 * | 2/2015 | Tezuka | A61B 5/14532 600/310 |
| 9,013,684 B2 * | 4/2015 | Xalter | G02B 26/0833 355/77 |
| 9,075,015 B2 | 7/2015 | Shapiro | |
| 9,395,293 B1 * | 7/2016 | Acosta | G06T 7/11 |
| 9,442,084 B2 | 9/2016 | Kakefuda | |
| 9,494,535 B2 | 11/2016 | Sezginer | |
| 9,562,848 B2 | 2/2017 | Goldring et al. | |
| 9,597,024 B2 | 3/2017 | Robinson et al. | |
| 10,274,426 B2 | 4/2019 | Arbore | |
| 10,620,105 B2 | 4/2020 | Trainer | |
| 2004/0113059 A1 * | 6/2004 | Kawano | G02B 21/002 250/234 |
| 2004/0212866 A1 | 10/2004 | Endo et al. | |
| 2006/0178570 A1 | 8/2006 | Robinson et al. | |
| 2006/0197753 A1 | 9/2006 | Hotelling | |
| 2007/0057211 A1 | 3/2007 | Bahlman et al. | |
| 2008/0124070 A1 | 5/2008 | Liang | |
| 2009/0284835 A1 * | 11/2009 | Meshulach | G02B 21/0068 359/486.01 |
| 2009/0310132 A1 | 12/2009 | Bennett et al. | |
| 2011/0081064 A1 | 4/2011 | Hsu et al. | |
| 2011/0184260 A1 | 7/2011 | Robinson et al. | |
| 2012/0070817 A1 * | 3/2012 | Wang | A61B 5/0059 435/3 |
| 2012/0140240 A1 | 6/2012 | Hillman | |
| 2012/0147377 A1 | 6/2012 | Schleipen et al. | |
| 2012/0281258 A1 | 11/2012 | Sheblee et al. | |
| 2014/0043620 A1 | 2/2014 | Ishii et al. | |
| 2014/0192355 A1 | 7/2014 | Froigneux et al. | |
| 2016/0091368 A1 | 3/2016 | Fish et al. | |
| 2018/0017491 A1 | 1/2018 | Arbore | |
| 2018/0017772 A1 | 1/2018 | Arbore | |
| 2019/0128734 A1 | 5/2019 | Arbore | |
| 2019/0204221 A1 | 7/2019 | Arbore | |

FOREIGN PATENT DOCUMENTS

| | | |
|---|---|---|
| CN | 102803930 | 11/2012 |
| EP | 0 168 983 A1 | 1/1986 |
| EP | 0 943 950 A1 | 9/1999 |
| JP | 2000-163031 A | 6/2000 |
| JP | 2002-342033 A | 11/2002 |
| JP | 2014163895 | 9/2014 |
| KR | 10-2009-0116731 A | 11/2009 |
| WO | WO-2006/086566 A2 | 8/2006 |
| WO | WO-2016/106350 A1 | 6/2016 |
| WO | WO-2016/109355 A1 | 7/2016 |
| WO | WO-2017/184420 A1 | 10/2017 |

OTHER PUBLICATIONS

International Search Report dated Apr. 1, 2016, for PCT Application No. PCT/US2015/067445, filed Dec. 22, 2015, five pages.
International Search Report dated Apr. 25, 2016, for PCT Application No. PCT/US2015/067463, filed Dec. 22, 2015, five pages.
Ke, S. et al. (Feb. 10, 2009) "Three-dimensional coherent transfer function for a confocal microscope with two D-shaped pupils,"

(56) References Cited

OTHER PUBLICATIONS

Applied Optics, Optical Society of America, Washington, DC; US, vol. 48, No. 5, pp. 810-817.
Kurugol, S. et al. (2011). "Semi-automated Algorithm for Localization of Dermal/Epidermal Junction in Reflectance Confocal Microscopy Images of Human Skin," Proc. of SPIE, vol. 7904, ten pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action dated May 15, 2018, for U.S. Appl. No. 15/717,651, filed Sep. 27, 2017, 15 pages.
Non-Final Office Action dated Mar. 19, 2019, for U.S. Appl. No. 15/717,573, filed Sep. 27, 2017, 8 pages.
Notice of Allowance dated Dec. 14, 2018, for U.S. Appl. No. 15/717,651, filed Sep. 27, 2017, 8 pages.
Sayli et al., "Two-distance partial path length method for accurate measurement of muscle oxidative metabolism using fNIRS," Proceeding of SPIE, Bellingham, Washington USA, vol. 6084, 2006, 8 pages.

\* cited by examiner

CONFOCAL INSPECTION SYSTEM HAVING AVERAGED ILLUMINATION AND AVERAGED COLLECTION PATHS

CROSS-REFERENCE TO RELATED APPLICATION

This application is a National Phase Patent Application under 35 U.S.C. § 371 of International Application No. PCT/US2015/067480, filed Dec. 22, 2015, and claims the benefit of U.S. Provisional Application No. 62/096,282, titled "CONFOCAL INSPECTION SYSTEM HAVING AVERAGED ILLUMINATION AND AVERAGED COLLECTION PATHS," and filed on Dec. 23, 2014, which is hereby incorporated by reference in its entirety.

TECHNICAL FIELD

The present disclosure relates to a confocal optical inspection system that averages the illumination optical path and/or the collection optical path to produce a single measurement of a physical property of a sample, rather than an image of the sample.

BACKGROUND

Many common optical inspection systems generate images of a sample. A typical inspection system can form an image in which a specified depth within the sample is sharply in focus, while depths away from the specified depths are blurred due to defocus. A confocal inspection system can attenuate, rather than blur, depths away from the specified depth, so that the confocal system can produce images of a single plane at the specified depth within the sample.

SUMMARY OF THE DISCLOSURE

A confocal inspection system can optically characterize a sample. An objective lens, or separate incident and return lenses, can deliver incident light from a light source to the sample, and can collect light from the sample. Confocal optics can direct the collected light onto a detector. The system can average the incident light over multiple locations at the sample, for example, by scanning the incident light with a pivotable mirror in the incident and return optical paths, or by illuminating and collecting with multiple spaced-apart confocal apertures. The system can average the collected light, for example, by directing the collected light onto a single-pixel detector, or by directing the collected light onto a multi-pixel detector and averaging the pixel output signals to form a single electronic signal, and/or produce a single measurement of a physical property of the sample. Averaging the incident and/or return light can be advantageous for structured or inhomogeneous samples.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
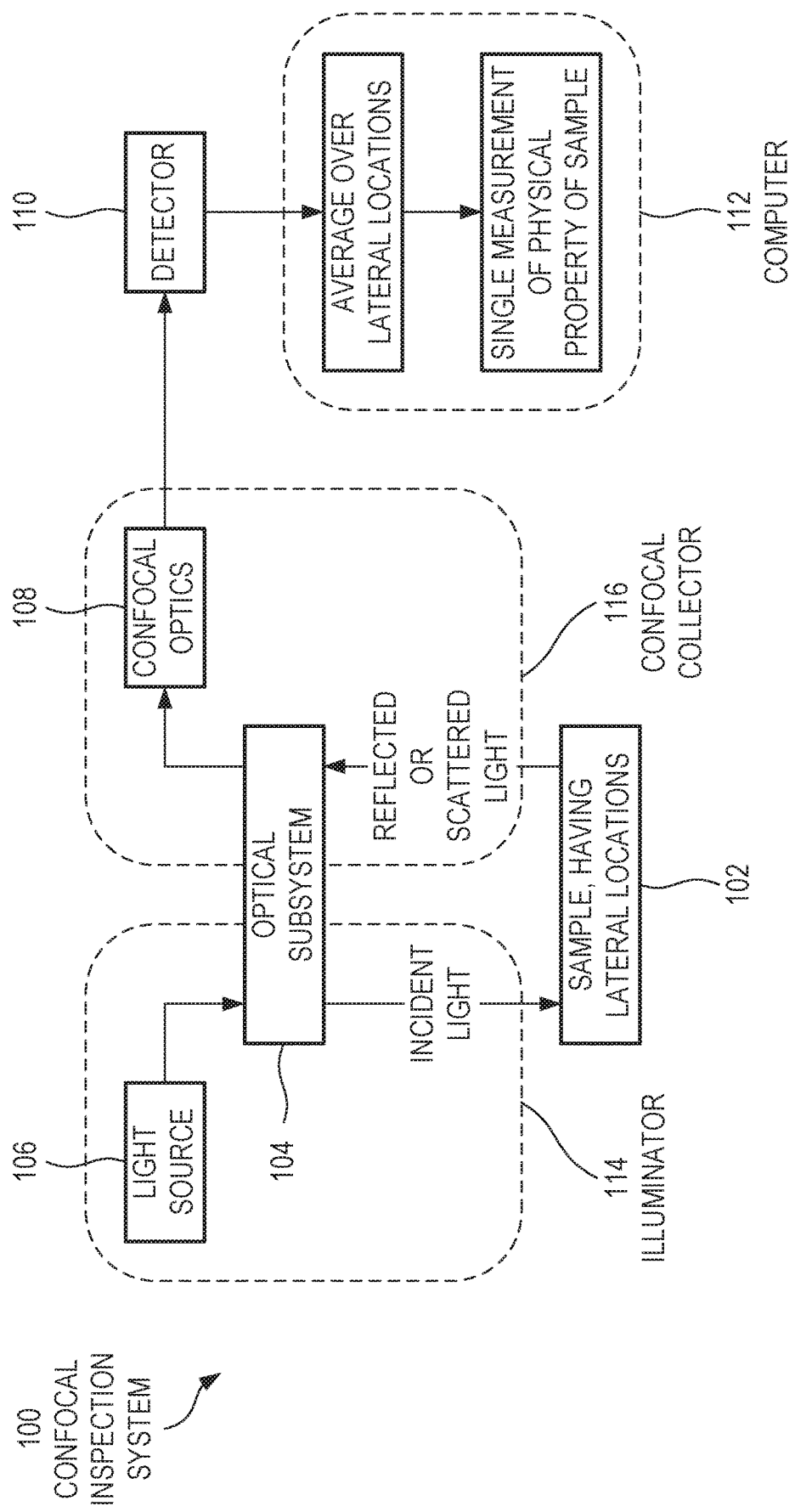
FIG. 1 is a schematic drawing of an example of a confocal inspection system for optically characterizing a sample, in accordance with some embodiments.

FIG. 1 is a schematic drawing of an example of a confocal inspection system 100 for optically characterizing a sample 102, in accordance with some embodiments. The sample 102 is not part of the confocal inspection system 100. Upon reading and understanding the present description, one of skill in the art will appreciate that the system 100 in FIG. 1 is but one example, and that other configurations can be used without departing from the scope of the present subject matter.

An optical subsystem 104 is configured to deliver incident light from a light source 106 to a plurality of lateral locations at the sample 102 and collect light reflected and/or scattered from the sample 102. In some examples, the lateral locations are contiguous. In other examples, at least one of the lateral locations in non-contiguous. In still other examples, all of the lateral locations are laterally separated from one another. In some examples, the optical subsystem 104 includes a single objective lens, which can deliver incident light and can also collect the reflected or scatter light. In other examples, the optical subsystem 104 includes separate incident and return lenses for delivering light to the sample and collecting light from the sample 102, respectively.

The light sources of the system described herein, such as light source 106, can be configured to emit light at one of a plurality of selectable wavelengths. In some examples, the light source 106 can produce light at two wavelengths, three wavelengths, four wavelengths, or more than four wavelengths. The light source 106 can include one or more light-producing elements. Examples of suitable light-producing elements include, but are not limited to, one or a combination of: a single semiconductor laser, multiple semiconductor lasers having the same wavelength, multiple semiconductor lasers having different wavelengths, a single light emitting diode, multiple light emitting diodes having the same wavelength, multiple light emitting diodes having different wavelengths, one or more quantum cascade lasers, one or more superluminescent light sources, one or more amplified spontaneous emission sources. In some examples, the light source produces a selectable wavelength, a return optical path includes one or more wavelength-selective elements, such as a filter or grating, and the system can perform spectroscopic measurements of the sample. In some examples, the sample can produce light wavelengths other than the incident wavelength(s), such as through fluorescence or Raman scattering; for these examples, the return path can also include a suitable wavelength-selective element. Light source 106 can optionally include one or more collimating or focusing elements, which can be made integral with the light-producing elements or can be made separately and attached to the light-producing elements.

Confocal optics 108 are configured to direct the collected light onto a detector 110. The confocal optics 108 and detector 110 are configured to generate signals from light received from a specified depth at or below a surface of the sample 102 and reject signals from light received from depths away from the specified depth. The detector 110 produces at least one pixel signal in response to light directed thereon. There are many possible schemes for using confocal techniques to limit the signals to a specified depth at or below the surface of the sample 102, including a stationary pinhole, a scanning pinhole, multiple scanning pinholes, techniques employing one or more arrays of micromirrors, and others. Several examples of confocal techniques are discussed in detail below.

In some examples, the light source 106 and the optical subsystem 104 can be grouped as an illuminator 114 configured to illuminate a plurality of lateral locations on the sample 102. In some examples, the optical subsystem 104 and the confocal optics 108 can be grouped as a confocal collector 116 configured to collect light reflected and/or scattered from the sample 102 and direct the collected light onto the detector 110. The confocal collector 116 is configured to generate signals from light received from a specified depth at or below the surface of the sample 102 and reject signals from light received from depths away from the specified depth.

A computer 112 is configured to form a single electrical signal by averaging the at least one pixel signal over the plurality of lateral locations. In some examples, the computer 112 is configured to retrieve a plurality of electrical signals from the detector 110, each electrical signal corresponding to a different lateral position at the sample 102, and average the retrieved electrical signals to produce a single measurement of a physical property of the sample 102.

There are many possible schemes for averaging over the plurality of lateral locations, such as scanning or raster scanning the incident light over the lateral locations at the sample and averaging the detected signals, illuminating and confocally detecting using multiple spaced-apart apertures in an opaque screen, directing the collected light onto a single-pixel detector, detecting with a multi-pixel detector and averaging the pixel signals, and others. In some examples, the lateral locations are sequentially illuminated, and the generated signals are averaged in time. In other examples, the lateral locations are simultaneously illuminated. In some examples, averaging over the lateral locations can advantageously help measure structured or inhomogeneous samples, where the structure or inhomogeneity can obstruct typical optical characterization.

In some examples, the detector 110 is a single-pixel detector producing a single pixel signal. In other examples, the detector 110 is a multi-pixel detector producing a plurality of pixel signals. For these examples, the computer 112 is configured to form the single electrical signal by averaging the plurality of pixel signals.

Computer 112 is further configured to produce a single measurement of a physical property of the sample 102 in response to the single electrical signal. Examples of suitable physical properties include, but are not limited to, reflectivity, absorptivity, refractive index, density, analyte concentration, scattering coefficient, and scattering anisotropy.

Computer 112 can be realized in combinations of hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

Figure 2:
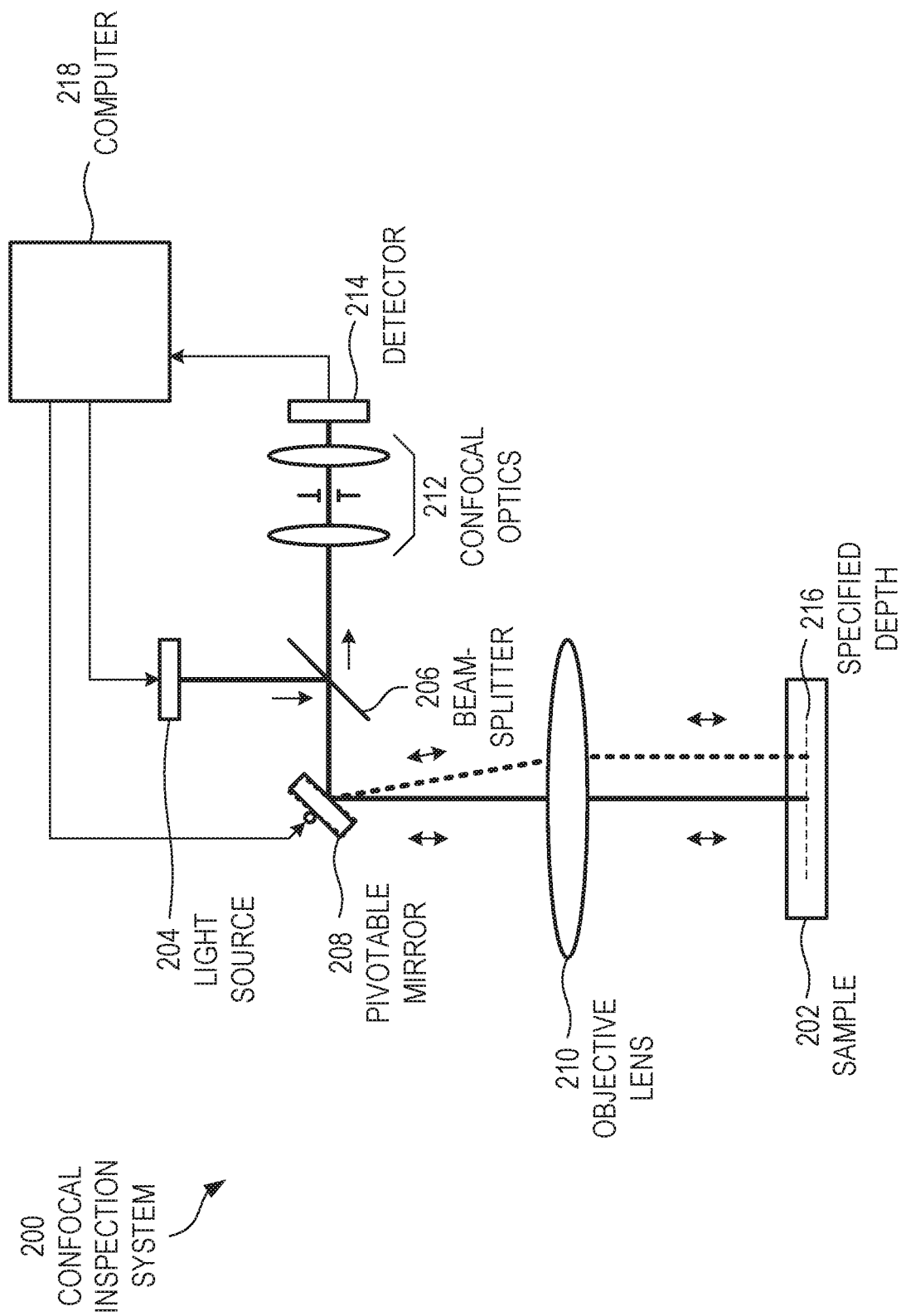
FIG. 2 is a schematic drawing of another example of a confocal optical system for optically characterizing a sample, in accordance with some embodiments.

FIG. 2 is a schematic drawing of another example of a confocal optical system 200 for optically characterizing a sample 202, in accordance with various embodiments. The example of FIG. 2 is but one example of sequential illumination and collection, and other sequential configurations are possible without departing from the scope of the present subject matter.

In FIG. 2, a light source 204 is configured to produce incident light for illuminating the sample 202. The incident light reflects from a beamsplitter 206; in other configurations, the incident light can transmit through the beamsplitter 206. A pivotable mirror 208 is configured to reflect the incident light at a selectable reflected angle. An objective lens 210 is configured to receive the reflected incident light at the selectable reflected angle and direct the reflected incident light onto the sample 202 at a lateral location that corresponds to the selectable reflected angle. The objective lens is further configured to collect the light reflected or scattered from the sample 202. The pivotable mirror 208 is further configured to reflect the collected light. The light returning from the sample 202 retraces its route, so that as the pivotable mirror 208 changes position and translates the illuminated spot at the sample, the return beam reflected from the pivotable mirror remains stationary. The beamsplitter 206 transmits the reflected collected light from the pivotable mirror 208. Confocal optics 212 direct the collected light onto a detector 214. The confocal optics 212 and the detector 214 generate signals from light received from a specified depth 216 at or below a surface of the sample and reject signals from light received from depths away from the specified depth 216. In this example, the confocal optics 212 includes an opaque screen located conjugate to the specified depth 216, the opaque screen having an aperture therethrough, the aperture sized to transmit light reflected or scattered from the specified depth 216 and block light reflected or scattered at depths away from the specified depth 216. Computer 218 receives the electrical signal(s) produces by the detector 214, controls the position of the pivotable mirror 208, and optionally controls the light source 204. In some examples, the specified depth 216 can be selected so that a total optical path length traversed within the sample can equal, or can be relatively close to, an inverse of an expected scattering coefficient of the sample; the Appendix discusses this in detail.

The illuminator of the confocal inspection system 200 includes the light source 204, the pivotable mirror 208, and the objective lens 210. Similarly, the confocal collector of the confocal inspection system 200 includes the objective lens 210, the pivotable mirror 208, and the confocal optics 212.

In the example of FIG. 2, the illuminator sequentially illuminates the plurality of lateral locations on the sample, the confocal collector sequentially detects the collected light, and the computer sequentially retrieves the plurality of electrical signals from the detector. Other sequential configurations are possible. There are alternate configurations, in which the illuminator simultaneously illuminates the plurality of lateral locations on the sample. Examples of these simultaneous configurations are shown in FIGS. 3 and 4.

Figure 3:
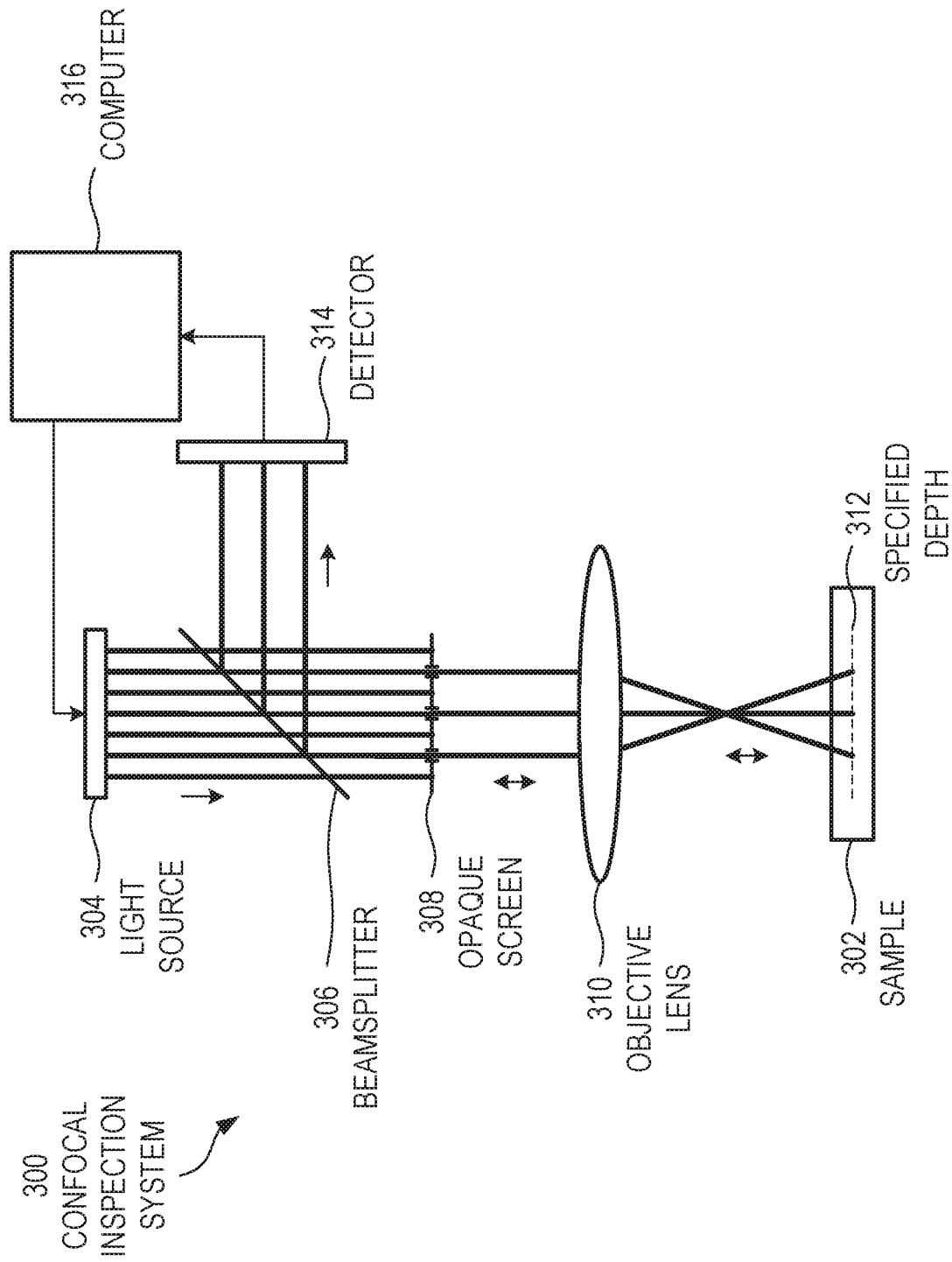
FIG. 3 is a schematic drawing of another example of a confocal optical system for optically characterizing a sample, in accordance with some embodiments.
Figure 4:
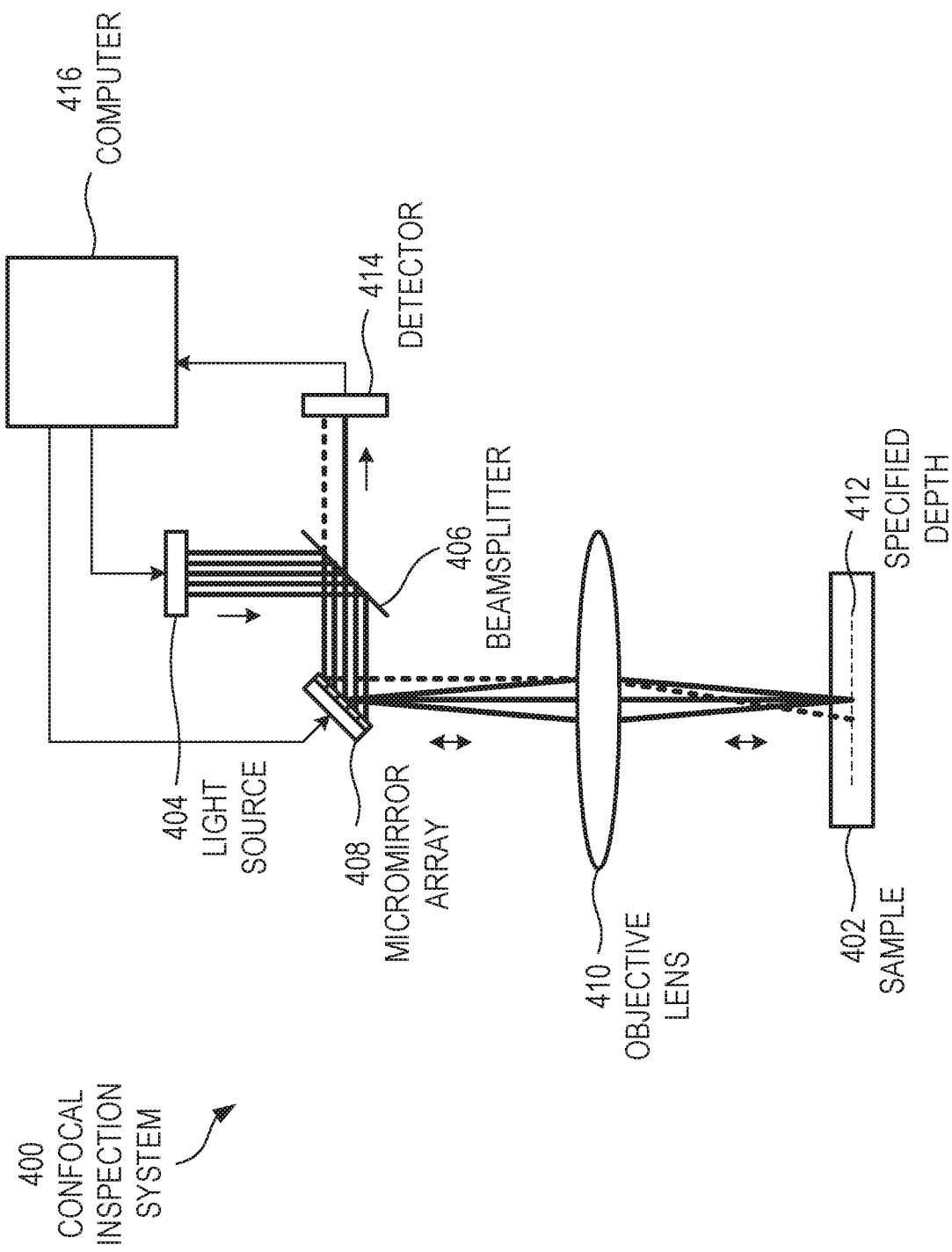
FIG. 4 is a schematic drawing of another example of a confocal optical system for optically characterizing a sample, in accordance with some embodiments.

FIG. 3 is a schematic drawing of another example of a confocal optical system 300 for optically characterizing a sample 302, in accordance with some embodiments. The example of FIG. 3 is but one example of simultaneous illumination and collection; other suitable simultaneous configurations are possible.

A light source 304 is configured to produce incident light for illuminating the sample 302. The incident light reflects from a beamsplitter 306; in other configurations, the incident light can transmit through the beamsplitter 306. An opaque screen 308 receives the incident light from the beamsplitter 306 and transmits a portion through a plurality of apertures. An objective lens 310 is configured to direct the incident light onto the sample 302 simultaneously at the plurality of lateral locations, and collect the light reflected or scattered from the sample 302. Each aperture in the opaque screen 308 is located to transmit light from a respective lateral location at the sample. Each aperture in the opaque screen 308 is sized to transmit light reflected or scattered from the specified depth 312 and block light reflected or scattered at depths away from the specified depth 312. The opaque screen 308 is conjugate to the sample 302, with respect to the objective lens 310, so that the objective lens 310 images the opaque screen 308 onto the sample 302 at the specified depth 312, and vice versa.

The illuminator in FIG. 3 includes the light source 304, the opaque screen 308, and the objective lens 310. The confocal collector in FIG. 3 includes the objective lens 310, the opaque screen 308 located conjugate to the specified depth 312, and, optionally, the beamsplitter 306. The confocal collector directs the collected light onto a detector 314. The confocal collector generates signals from light received from the specified depth 312 at or below the surface of the sample 302 and rejects signals from light received from depths away from the specified depth 312.

A computer 316 retrieves a plurality of electrical signals from the detector 314. Each electrical signal corresponds to a different lateral position at the sample. The computer 316 averages the retrieved electrical signals to produce a single measurement of a physical property of the sample 302. In some examples, the detector 314 can be located away from an image of the specified depth 312; such a positioning does not degrade the averaging of the system 300, but would degrade a comparable confocal system designed to produce images of the specified depth 312 in the sample 302.

FIG. 4 is a schematic drawing of another example of a confocal optical system 400 for optically characterizing a sample 402, in accordance with various embodiments. The example of FIG. 4 is another example of simultaneous illumination and collection. Other simultaneous configurations are possible without departing from the scope of the present subject matter.

A light source 404 is configured to produce incident light for illuminating the sample 402. The incident light reflects from a beamsplitter 406. In other configurations, the incident light transmits through the beamsplitter 406. A micromirror array 408 receives the incident light from the beamsplitter 406 and reflects, pixel-wise, a selectable portion of the incident light toward the sample. An objective lens 410 is configured to direct the incident light onto the sample 402 simultaneously at the plurality of lateral locations, and collect the light reflected or scattered from the sample 402. The micromirror array 408 and objective lens 410 are arranged so that the micromirror array 408 is conjugate to the specified depth 412 at or below the surface of the sample 402; in other words, the objective lens 410 forms an image of the micromirror array 408 at the specified depth 412.

The illuminator in FIG. 4 includes the light source 404, the micromirror array 408, and the objective lens 410. The confocal collector in FIG. 4 includes the objective lens 410, the micromirror array 408 located conjugate to the specified depth 412, and, optionally, the beamsplitter 406. The confocal collector directs the collected light onto a detector 414. The confocal collector generates signals from light received from the specified depth 412 at or below the surface of the sample 402 and rejects signals from light received from depths away from the specified depth 412.

In some examples, the detector 414 is a single-pixel detector. Such a single-pixel detector can effectively average any light incident thereon, and can direct a single electrical signal for the computer 416 to use in calculating a single measurement of a physical property of the sample. For such a single-pixel detector, the longitudinal location of the detector 414 can be varied. For example, a single-pixel can be located at an internal image of the micromirror array 408 and the specified depth 412 in the sample, or can be located away from the internal image of the micromirror array 408 and the specified depth 412 in the sample 402.

In other examples, the detector 414 is a multi-pixel detector. A multi-pixel detector produces an electrical signal for each pixel. In some examples, the electrical signals are directed to the computer 416, which combines them (such as average or sum) using software. In other examples, the electrical signals can be combined in hardware, and a single combined signal can be directed to the computer 416. The computer 416 can average the retrieved electrical signals to produce a single measurement of a physical property of the sample 402.

The computer 416 can control the micromirror array 408 in several possible modes. In one mode, the computer 416 controls the micromirror array 408 so that only one mirror at a time reflects incident light toward the sample. During the time interval that a mirror is reflective, the mirror functions like a pinhole in the opaque screen (FIG. 3), so that the only light reaching the detector has reflected from that particular mirror twice, once for the incident light and once for the return light. In this mode, the electrical signal received by the computer 416 corresponds to a raster scan of the specified depth 412 of the sample 402. The computer can average the electrical signal over time to produce a single measurement of a physical property of the sample 402.

In another mode, the micromirrors in the array 408 can be driven at unique assigned frequencies, with each assigned frequency corresponding to one or more mirrors, and their corresponding lateral locations at the sample 402. The computer can perform frequency analysis of the electrical signal or signals from the detector, so that a signal intensity at a particular assigned frequency represents a reflected and/or scattered intensity at the corresponding lateral location at the sample 402. The computer can average the electrical signals in hardware or in software, then used the averaged signal to produce a single measurement of a physical property of the sample 402.

Figure 5:
FIG. 5 is a flowchart of an example of a method for optically characterizing a sample, in accordance with some embodiments.

FIG. 5 is a flowchart of an example of a method 500 for optically characterizing a sample, in accordance with some embodiments of the present subject matter. Method 500 can be executed using the confocal inspection systems 100, 200, 300, 400 from FIGS. 1-4, or using other suitable confocal inspection systems.

At 502, a confocal optical system performing the method 500 illuminates a plurality of lateral locations on the sample. In some examples, the lateral locations are contiguous. In other examples, at least one of the lateral locations in non-contiguous. In still other examples, all of the lateral locations are laterally separated from one another.

At 504, the confocal optical system confocally detects light reflected or scattered from the sample. The confocal detection generates signals from light received from a specified depth at or below a surface of the sample and rejects signals from light received from depths away from the specified depth.

At 506, the system averages the generated signals over the lateral locations to produce a single measurement of a physical property of the sample. The physical property can include, for example, reflectivity, absorptivity, refractive index, density, analyte concentration, or other suitable physical properties. In some examples, the lateral locations are sequentially illuminated, and the generated signals are averaged in time. In other examples, the lateral locations are simultaneously illuminated.

An optical system performing method 500 averages signals over the lateral locations to produce a single measurement of a physical property of the sample. In some examples, averaging over the lateral locations can advantageously help measure structured or inhomogeneous samples, where the structure or inhomogeneity an obstruct typical optical characterization.

In some examples, it can be advantageous to narrow a range of optical path lengths traversed within the sample, which can be particularly advantageous for absorptive or scattering samples.

A technique for narrowing a range of optical path lengths traversed within the sample can use non-overlapping annular illumination and collection regions. In this example, a confocal inspection system can optically characterize a sample. In some configurations, an objective lens can deliver light to the sample via an incident optical path. The incident optical path can extend from a light source to an annular illumination region of the objective lens pupil to the sample. The objective lens can collect light from the sample via a return optical path. The return optical path can extend from the sample to an annular collection region of the pupil to a detector, and can include confocal optics. Using annular illumination and annular collection can ensure that the optical path length traversed within the sample is nearly the same for all collected rays, which can be advantageous for absorptive or scattering samples. The annular illumination region and the annular collection region can be non-overlapping in the pupil, which can exclude light retroreflected by the sample. In other configurations, the single objective lens can be replaced by separate incident and return lenses, with corresponding incident and return pupils.

Another technique for narrowing a range of optical path lengths traversed within the sample can use angularly narrow illumination and annular collection. In this example, a confocal inspection system can optically characterize a sample. An objective lens, having a pupil, can deliver incident light from a light source through an illumination region of the pupil to the sample. The incident light can have a reduced range of propagation angles at the sample. The objective lens can collect light from the sample through an annular collection region of the pupil. In alternate configurations, the incident and collected light can pass through separate incident and return lenses. Confocal optics can direct the collected light onto a detector, so that the detector generates signals from light received from a specified depth at or below a surface of the sample and rejects signals from light received from depths away from the specified depth. The angularly narrow incident light and annular collection region can narrow a range of optical path lengths traversed within the sample, which can be advantageous for absorptive or scattering samples.

Another technique for narrowing a range of optical path lengths traversed within the sample can use annular illumination and angularly narrow collection. In this example, a confocal inspection system can optically characterize a sample. An objective lens, having a pupil, can deliver incident light from a light source through an annular illumination region of the pupil to the sample. The objective lens can collect light from the sample through a collection region of the pupil. The collected light can have a reduced range of propagation angles leaving the sample. In alternate configurations, the incident and collected light can pass through separate incident and return lenses. Confocal optics can direct the collected light onto a detector, so that the detector generates signals from light received from a specified depth at or below a surface of the sample and rejects signals from light received from depths away from the specified depth. The annular incident light and angularly narrow collected light can narrow a range of optical path lengths traversed within the sample, which can be advantageous for absorptive or scattering samples.

Another technique for narrowing a range of optical path lengths traversed within the sample can use illumination and collection regions of the pupil, which, combined, have a surface area that is a fraction of the full pupil surface area (e.g., using angularly narrow illumination and collection). In this example, a confocal inspection system can optically characterize a sample. An objective lens, having a pupil, can deliver incident light from a light source through at least one illumination region of the pupil to the sample, and can collect light reflected or scattered from the sample through at least one collection region of the pupil. The illumination and collection regions are all non-overlapping in the pupil. In some examples, the illumination and collection regions, combined, have a surface area less than or equal to 50% of a surface area of the pupil. In some examples, the illumination and collection regions each have a surface area less than or equal to 10% of a surface area of the pupil. Confocal optics and a detector generate signals from light received from a specified depth at or below a surface of the sample and reject signals from light received from depths away from the specified depth. This technique of narrowing the range of optical path lengths traversed within the same is discussed in detail in FIGS. 6-16 and the accompanying text. Any or all of this technique, or with other techniques, can be used with the system and methods discussed in FIGS. 1-5 and the accompanying text.

Figure 6:
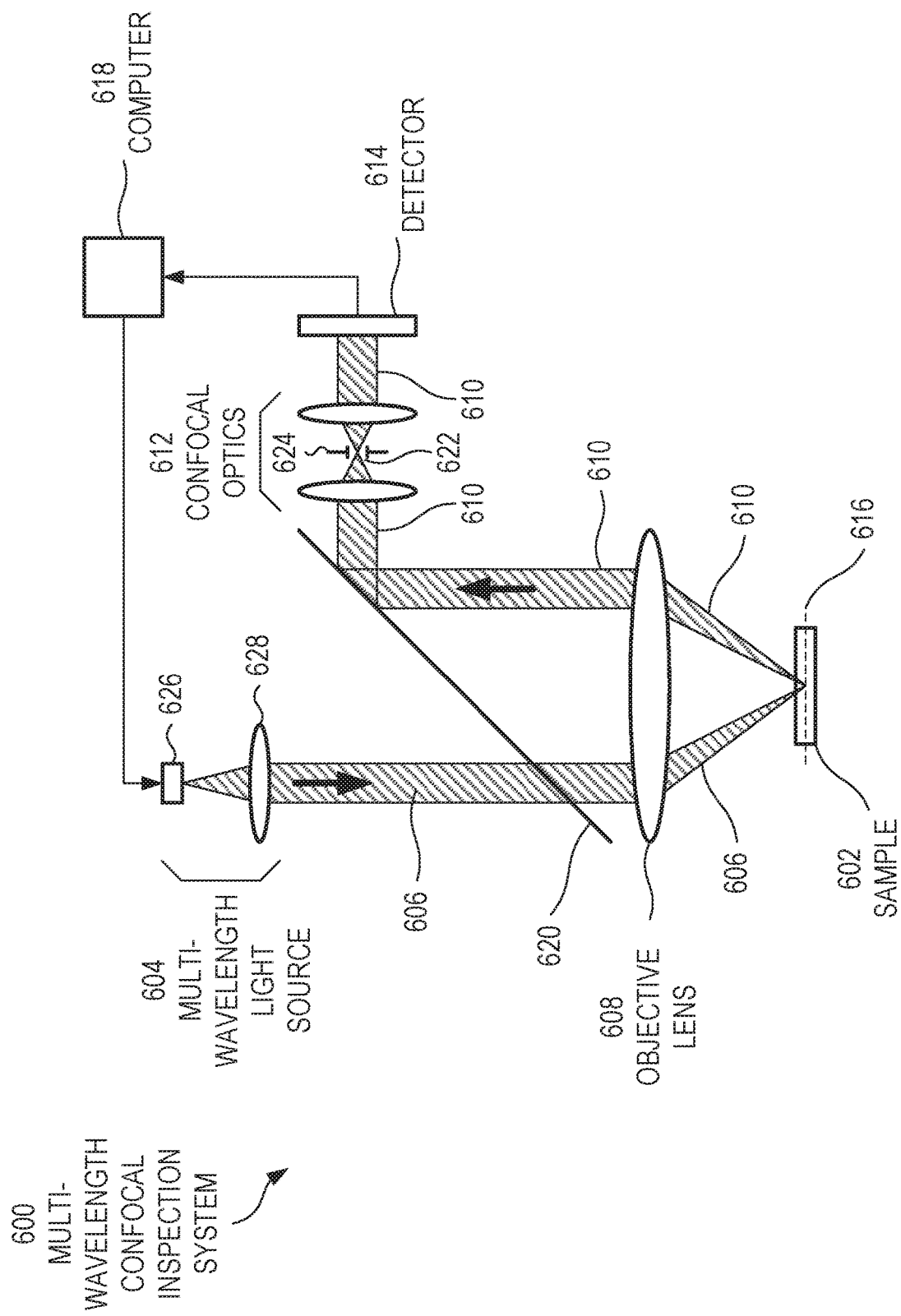
FIG. 6 is a schematic side view of an example of a multi-wavelength confocal inspection system, in accordance with some embodiments.

FIG. 6 is a functional block diagram of an example of a multi-wavelength confocal inspection system 600 for optically characterizing a sample 602, in accordance with some embodiments. The sample 602 is not part of the multi-wavelength confocal inspection system 600. FIG. 6 shows but one example of a configuration of a multi-wavelength confocal inspection system 600; other configurations are also possible. The multi-wavelength confocal inspection system 600 includes a multi-wavelength light source 604 configured to produce incident light 606 having at least a first wavelength and a second wavelength. In some examples, the incident light 606 has at least two discrete wavelengths. In some examples, the incident light 606 has at least one continuum of wavelengths. In some examples, the incident light 606 has a combination of discrete wavelengths and spectrally continuous regions.

The light sources of the systems described herein, such as light source 604, can include one or more light-producing elements 626. Examples of suitable light-producing elements 626 can include a semiconductor laser, a light emitting diode, a quantum cascade laser, a superluminescent light source, an amplified spontaneous emission source, and others. The light source 604 can include any combination of one or more of the suitable light-producing elements 626. In some examples, one or more of the light-producing elements 626 can be tunable. In some examples, two or more of the light-producing elements 626 can emit light at different wavelengths. In some examples, the light source 604 can include one or more collimating or focusing elements 628, which can collimate or focus light produced by the one or more light-producing elements 626. In some examples, the one or more collimating or focusing elements 628 can be made integral with the light-producing elements 626. In other examples, the one or more collimating or focusing elements 628 can be made separately and attached to the light-producing elements 626. In some examples, the light source 604 can be controlled by a computer, such as 618.

In various embodiments, the light-producing elements are modulated independently and simultaneously at unique assigned frequencies. Modulation of the light source can include switching each light-producing element on and off periodically (e.g., digital modulation), or periodically varying the output intensity of each light-producing element (e.g., analog modulation), such as between zero and a peak value or between a relatively low value and a relatively high value.

In various embodiments, the light source produces a selectable wavelength, the return optical path includes one or more wavelength-selective elements, such as a filter or grating, and the system can perform spectroscopic measurements of the sample. In some examples, the sample can produce light wavelengths other than the incident wavelength(s), such as through fluorescence or Raman scattering; for these examples, the return path can also include a suitable wavelength-selective element.

In various embodiments, such as the embodiment shown in FIG. 6, the confocal inspection system includes a beamsplitter 620 positioned between light source 604 and an objective lens 608. In some examples, such as shown in FIG. 6, the beamsplitter 620 is positioned to transmit the light directed toward objective lens 608 (e.g., light produced from light source 604), and reflect light collected from objective lens 608. In other configurations, beamsplitter 620 can reflect the light directed toward objective lens 608, and can transmit light collected from objective lens 608.

In some examples, beamsplitter 620 can include one or more masked regions, which can preferentially block (or transmit) specific portions of a light beam incident thereon. Specifically, for an incident light beam having a particular lateral footprint that extends over all or a portion of one or more masked regions, the transmitted (or blocked) portions of the footprint form the incident or return optical path, while the blocked (or transmitted) portions of the footprint are excluded from the incident or return optical path. As such, the one or more masked regions can define the incident and/or return optical paths, as well as illumination region(s) and/or collection region(s) in the pupil of objective lens 620. In some examples, one or more of the masked regions can be disposed as a stand-alone optical element (not shown), or disposed on one or more of the other optical elements in the multi-wavelength confocal inspection system 600.

The multi-wavelength confocal inspection system 600 includes an objective lens 608 having a pupil. In FIG. 6, the pupil is oriented perpendicular to the plane of the figure and parallel to the bottom of the figure. Several examples of pupils are shown in detail in the figures that follow. The objective lens 608 is configured to deliver the incident light 606 from the multi-wavelength light source 604, through at least one illumination region of the pupil, to the sample 602. The objective lens 608 is further configured to collect light 610 reflected or scattered from the sample 602 through at least one collection region of the pupil. The illumination and collection regions can all be non-overlapping in the pupil. Using non-overlapping regions can exclude light retroreflected by the sample 602, which can be desirable for some applications.

The objective lens 608 can be achromatic, e.g., color-corrected. For instance, the objective lens 608 can focus light at a first wavelength to a specified depth 616 within the sample 602, and can additionally focus light at a second wavelength, different from the first wavelength, to the same specified depth 616 within the sample. The objective lens 608 can achieve its color correction by including at least two elements having values of chromatic aberration that sum to zero or to a reduced value. In sonic examples, the objective lens 608 can include at least two refractive elements formed from different optical materials. In these examples, the refractive elements can be positioned so that the incident and collected light transmit sequentially through the refractive elements. In these examples, each refractive element has a corresponding individual chromatic aberration. In these examples, a sum of the individual chromatic aberrations of the refractive elements is less than an absolute value of each of the individual chromatic aberrations. In some examples, the objective lens 608 can include at least one refractive element and at least one diffractive element. In these examples, the refractive and diffractive elements can be positioned so that the incident and collected light transmit sequentially through the refractive and diffractive elements. In these examples, each refractive and diffractive element has a corresponding individual chromatic aberration. In these examples, a sum of the individual chromatic aberrations of the refractive and diffractive elements is less than an absolute value of each of the individual chromatic aberrations.

The multi-wavelength confocal inspection system 600 includes confocal optics 612 arranged to receive light 610 collected from the sample 602 by the objective lens 608, and also includes a detector 614. The detector 614 and confocal optics 612 can be configured so that the detector 614 produces signals generated from light received from a specified depth 616 below a surface of the sample 602 and rejects signals generated from light received from depths away from the specified depth 616. There are many possible configurations for confocal optics 612.

In some configurations, such as in the example of FIG. 6, the confocal optics physically block light arising from reflection and/or scattering at depths away from the specified depth. In the example of FIG. 6, confocal optics 612 are arranged in a pinhole configuration, where light originating at specified depth 616 is imaged onto a suitably sized pinhole 622 in a screen 624, transmits through the pinhole 622, and is detected by detector 614. Light originating at depths away from the specified depth appears out-of-focus at the screen 624. The size of the out-of-focus light at the screen 624 is significantly larger than the pinhole 622, and the fraction of light transmitted through the pinhole 622 can be relatively small. In this manner, the pinhole configuration can retain only light originating from reflection and/or scattering at specified depth 616, and can extinguish or attenuate light originating from other depths. In some configurations, a portion of the confocal optics can be disposed in the incident optical path, in addition to the portion in the return optical path.

In other configurations, the light from other depths reaches the detector, and the system electronically filters out the contributions from the other depths. For instance, the confocal optics can include one or more modulating elements, such as one or more arrays of micromirrors or one or more arrays of acousto-optic modulators or electro-optic modulators. Incident light in the incident optical path and/or return light in the return optical path can strike the modulating elements, which can be configured to modulate different lateral portions of the incident and/or reflected light at unique assigned frequencies. By modulating the incident and/or return light twice, simultaneously, at the same unique assigned frequencies and at two different longitudinal locations between the light source 604 and the detector 614, inclusive, these configurations can simultaneously measure multiple lateral locations at specified depth 616, which can be advantageous over a pinhole configuration that only measures one location at a time.

In some examples, detector 614 is a single-pixel detector, which produces an electrical signal in response to light incident thereon. For a single-pixel detector, one or more collection regions of the pupil is defined upstream from the detector. For instance, a mask on an optical element defines the one or more collection regions of the pupil. As another example, a suitable modulator, such as an array of micromirrors or a pixelated liquid crystal panel sandwiched between two polarizers, defines the one or more collection regions of the pupil.

In other examples, detector 614 is a multi-pixel detector. For a multi-pixel detector, detector 614 collects light from each of its pixels, and can selectively sum the signals originating from specified locations. For instance, if the objective lens pupil is imaged onto detector 614, detector 614 can selectively sum signals originating from a suitable pixel or group of pixels. Such selective summation can augment or replace using a mask elsewhere in the multi-wavelength confocal inspection system 600. For these examples, the detector 614 collects all the return light, software can define which regions of the return light to use, and the software can therefore define the collection region of the pupil.

Detector 614 provides one or more electrical signals to computer 618. In some examples, the detector 614 produces a first electrical signal in response to light at the first wavelength directed thereon. In these examples, the detector 614 produces a second electrical signal in response to light at the second wavelength directed thereon. In these examples, the computer 618 can be configured to produce a single measurement of a physical property of the sample in response to at least the first and second electrical signals.

For instance, computer 618 can perform a spectroscopic calculation to determine a concentration value of a particular analyte within the sample. For these calculations, one or more ratios of measured reflectivity and/or scattering from the sample at two or more specified wavelengths can be compared with a lookup table of values. The computer 618 can determine a value of analyte concentration within the sample from the lookup table, and can return the analyte concentration as a single measurement of a physical property of the sample. Analyte concentration is but one example, the multi-wavelength confocal inspection system 600 can measure other suitable physical properties, such as refractive index, absorption, presence of a particular analyte, and others.

Computer 618 can be included in a computer system that includes hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

At the sample, the incident light 606 is angularly narrow, and has a reduced range of propagation angles compared to illumination generated through the full surface area of the objective lens pupil. One advantage of using angularly narrow incident light is that such light reduces the range of optical path lengths traversed within the sample, so that the each ray travels essentially the same length within the sample to the specified depth below the surface of the sample. This can be advantageous for absorptive or scattering samples, in which a variation in optical path length within the sample can produce unwanted variation in the amount of light returned to the objective lens 608. The surface of the sample 602 can be positioned to be perpendicular to a longitudinal axis of the objective lens 608, to within typical manufacturing and alignment tolerances.

The term "angularly narrow" relates to the angular width of illuminating and collected light. It can be expressed as a percentage of the ratio of a surface area of the objective lens pupil used for illumination and/or collection, divided by a total surface area of the objective lens pupil. As the percentage decreases, the angular width of the illumination and/or the collection decreases. In practice, the confocal inspection system compromises between increasing signal-to-noise ratio, which drives the percentage higher, and reducing the range of optical path lengths traversed within the sample, which drives the percentage lower. The percentages can be expressed in terms of illumination and collection regions combined, or in terms of illumination and collection regions individually. For the system 600 of FIG. 6, an example of an acceptable range of surface areas for the illumination and collection regions, combined, is between 5% and 90% of a surface area of the pupil. An example of a preferred range of surface areas for the illumination and collection regions, combined, is between 5% and 60% of the surface area of the pupil. These are but two examples of suitable ranges other suitable ranges can also be used. An example of an acceptable range of surface areas for the illumination region and the collection region is each being between 1% and 50% of the surface area of the pupil. An example of a preferred range of surface areas for the illumination region and the collection region is each being between 5% and 25% of the surface area of the pupil. These are but two examples of suitable ranges; other suitable ranges can also be used.

The term "angularly narrow" can also be expressed as a figure of merit for variation of optical path length within the sample. Such a figure of merit can assign weights to the various sources of uncertainty in the optical path length within the sample. One such figure of merit can include a size of the illuminating beam at the selected measurement depth in the sample, normalized to the selected depth, and additionally normalized to a sine of an angular range. The angular range can be the total angular range of the illuminating light at the sample, and/or the total angular range at the sample of light collected from the sample and used to perform a downstream analysis. One specific example of a figure of merit can equal the beam diameter at the sample, divided by the total optical path length within the sample, and added to a sine of the angular range. In a specific numerical example, an inner radial angle of the illuminating light and/or the collected light can equal 30 degrees, an outer radial angle of the illuminating light and/or the collected light can equal 35 degrees, and the angular range can equal the difference between 35 degrees and 30 degrees, i.e., 5 degrees. The numerical value of 5 degrees is but one example; other numerical values can also be used, such as 10 degrees or 15 degrees.

In some examples, the illumination regions, combined, deliver the incident light to the sample with an angular range less than or equal to 10 degrees at the sample. In some examples, the collection regions, combined, collect the reflected or scattered light with an angular range less than or equal to 10 degrees at the sample. In some examples, each illumination region delivers the incident light to the sample with an angular range less than or equal to 10 degrees at the sample. In some examples, each collection region collects the reflected or scattered light with an angular range less than or equal to 10 degrees at the sample.

The objective lens 608 has a pupil, which is shown in end-on views below in FIGS. 8-15 as element numbers 800, 900, 1000, 1100, 1200, 1300, 1400, and 1500, respectively. In some examples, the incident optical path (e.g., between the multi-wavelength light source 604 and the objective lens 608) includes one or more additional beam-steering or imaging elements, which may image a mask on beamsplitter 620 onto a pupil of objective lens 608. In some examples, the return optical path (e.g., between the objective lens 608 and the detector 614) can include one or more additional beam-steering or imaging elements, which can image the pupil of the objective lens 608 onto a mask and/or onto the detector 614. For simplicity, the Figures are drawn under the assumption that light bends at a single plane at the objective lens, even though in practice, light can bend at more than one plane within the objective lens.

Figure 7:
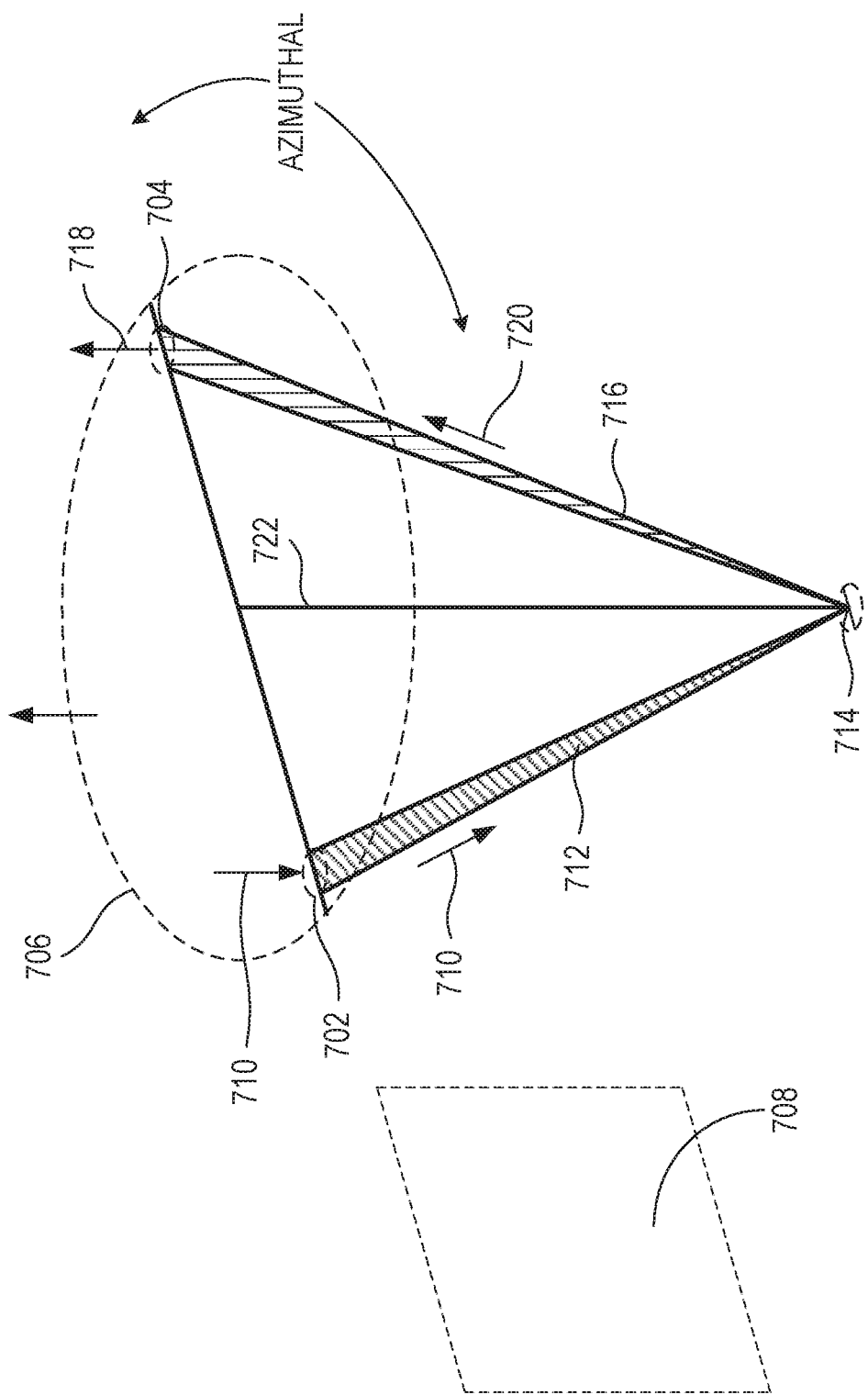
FIG. 7 shows a cross-section of examples of illumination and collection regions in the objective lens pupil, taken in a plane perpendicular to a top surface of the sample, in accordance with some embodiments.

FIG. 7 shows a cross-section of examples of an illumination region 702 and a collection region 704 in the objective lens pupil 706, taken in a plane 708 perpendicular to a top surface of the sample, in accordance with some embodiments. As noted above, it is assumed that the pupil 706 is coincident with the objective lens, even though in practice the pupil may be located in front of or behind the lens.

Incident light 710 strikes the objective lens pupil 706 in the illumination region 702, and propagates as an angularly narrow beam 712 to a location 714 at or near the surface of a sample. The incident light 710 can reflect and/or scatter into many directions, with reflections and/or scattering originating from many depths within the sample, depending on the properties of the sample, but not all of the reflected and/or scattered light is detected by the optical system. Light rays that are detected are constrained to reside within diverging cone 716; all other rays are either blocked optically by the geometry of collection region mask(s) and the confocal optics (612; FIG. 6), or are excluded electronically from the electrical signal or signals produced by the detector (614; FIG. 6). The detected rays emerge from the collection region 704 as return light 718.

Although the regions 702, 704 are shown in FIG. 7 as being circular, they can have any suitable shapes, including both symmetric shapes and asymmetric shapes. The regions 702, 704 may or may not have the same shape.

For many of the pupil configurations described below (such as in FIGS. 9-14), the illumination region(s) and the collection region(s) are said to be azimuthally distinct. For the purposes of this document, azimuthally distinct regions can be arranged to fall completely on opposite sides of a dividing line drawn through the center of the pupil. For example, wedges of a pie are said to be azimuthally distinct. For illumination or collection regions that include at least two non-contiguous sub regions, it is assumed that each non-contiguous illumination region is azimuthally distinct from all of the collection regions, and/or each non-contiguous collection region is azimuthally distinct from all of the illumination regions.

FIGS. 8-15 are end-on views of examples of objective lens pupils having non-overlapping illumination and collection regions. Using illumination regions and collections regions that do not overlap can prevent retroreflections from being detected by the system. Blocking retroreflections can be desirable in some instances. Those of skill in the art will appreciate that other configurations are possible without departing from the scope of the present subject matter.

Figure 8:
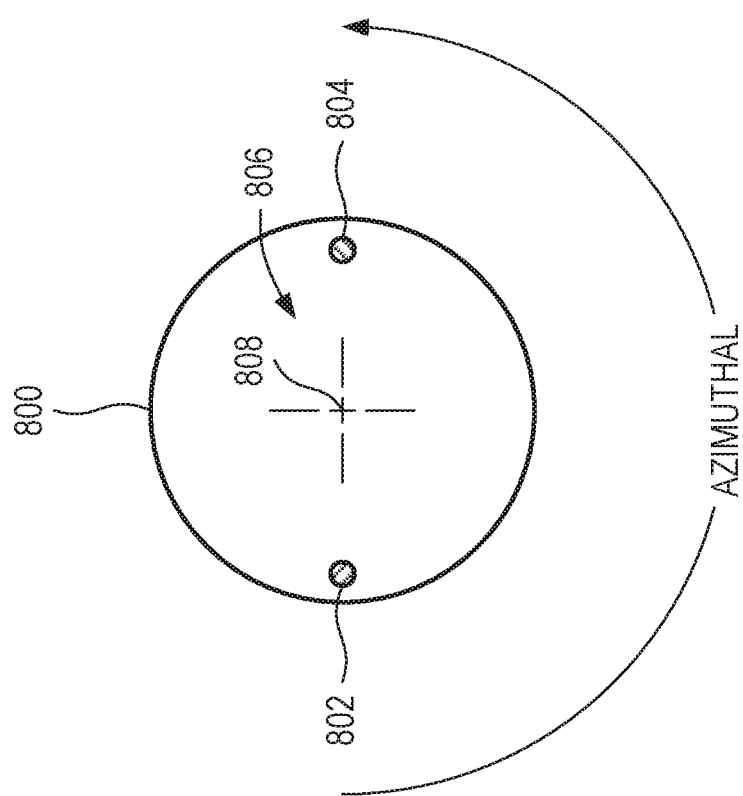
FIG. 8 is an end-on view of the example of an objective lens pupil, in accordance with some embodiments.

FIG. 8 is an end-on view of an example of an objective lens pupil 800, including an illumination region 802 and a collection region 804, in accordance with some embodiments. The illumination region 802 and the collection region 804 are shown in FIG. 8 as being circular, although any suitable shape can also be used. The illumination region 802 and collection region 804 can optionally have different shapes. In the example of FIG. 8, the single illumination region 802 and the single collection region 804 are disposed on opposite sides of a central axis 808 of the objective lens. In the example of FIG. 8, a central portion 806 of the objective lens pupil 800 is excluded from both the illumination region 802 and the collection region 804; in other examples, the central axis 808 can be included in an illumination or collection region.

Figure 9:
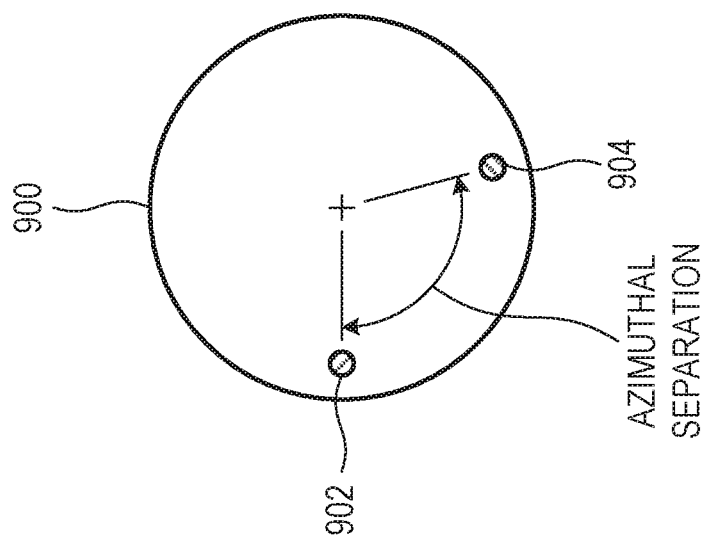
FIG. 9 is an end-on view of another example of an objective lens pupil, including a single illumination region azimuthally separated from a single collection region, in accordance with some embodiments.

FIG. 9 is an end-on view of another example of an objective lens pupil 900, including an illumination region 902 and a collection region 904, in accordance with some embodiments. In the example of FIG. 9, the illumination region 902 and the collection region 904 are azimuthally separated.

Figure 10:
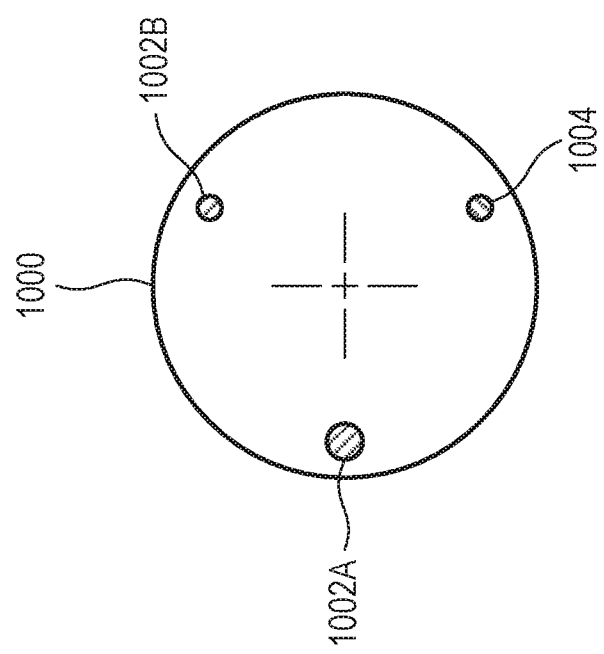
FIG. 10 is an end-on view of another example of an objective lens pupil, including two illumination regions of different sizes and a single collection region, in accordance with some embodiments.

FIG. 10 is an end-on view of another example of an objective lens pupil 1000, including a plurality of illumination regions 1002A, 1002B and a collection region 1004, in accordance with some embodiments. In the example of FIG. 10, the illumination and collection regions are azimuthally spaced apart evenly. In the example of FIG. 10, two of the illumination regions 1002A, 1002B have different sizes and/or shapes; in other examples, all the illumination regions can have the same size and/or shape. In the example of FIG. 10, the illumination regions 1002A, 1002B and the collection region 1004 are all equidistant from a central axis of the objective lens.

Figure 11:
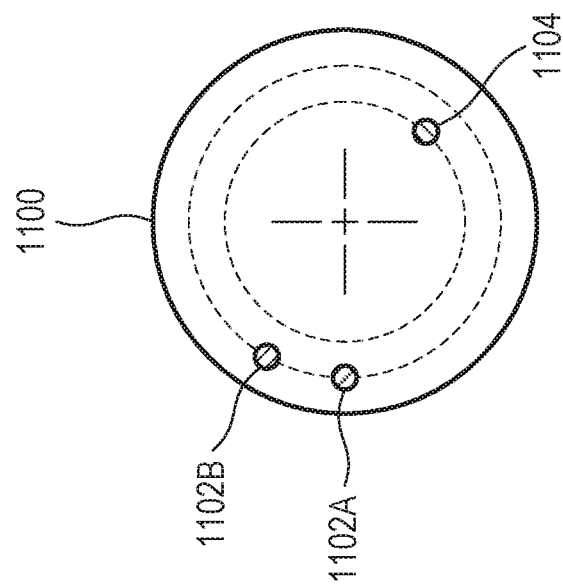
FIG. 11 is an end-on view of another example of an objective lens pupil, including two illumination regions farther away from a center of the pupil than a single collection region, in accordance with some embodiments.

FIG. 11 is an end-on view of another example of an objective lens pupil 1100, including a plurality of illumination regions 1102A, 1102B and a collection region 1104, in accordance with some embodiments. In the example of FIG. 11, the illumination regions 1102A, 1102B are all equidistant from a central axis of the objective lens. In the example of FIG. 11, a separation between the central axis and the illumination regions 1102A, 1102B is different from (e.g., greater than) a separation between the central axis and at least one collection region 1104. Such separations can also be different if there is only a single illumination regions and a single collection region.

Figure 12:
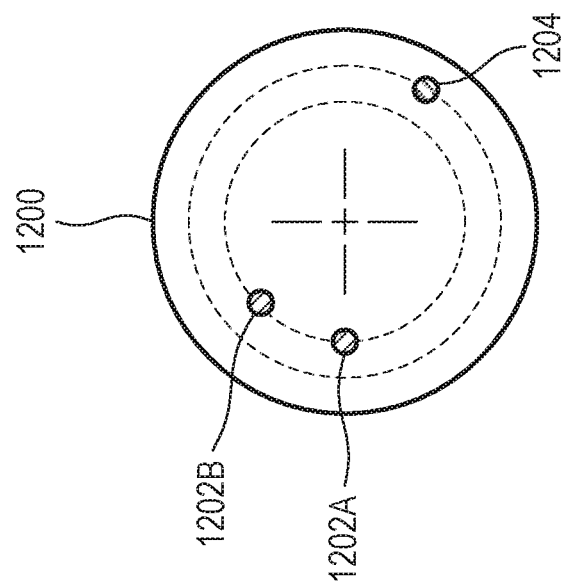
FIG. 12 is an end-on view of another example of an objective lens pupil, including two illumination regions closer to a center of the pupil than a single collection region, in accordance with some embodiments.

FIG. 12 is an end-on view of another example of an objective lens pupil 1200, including a plurality of illumination regions 1202A, 1202B and a collection region 1204, in accordance with some embodiments. In the example of FIG. 12, the illumination regions 1202A, 1202B are all equidistant from a central axis of the objective lens. In the example of FIG. 12, a separation between the central axis and the illumination regions 1202A, 1202B is different from (e.g., less than) a separation between the central axis and at least one collection region 1204.

Figure 13:
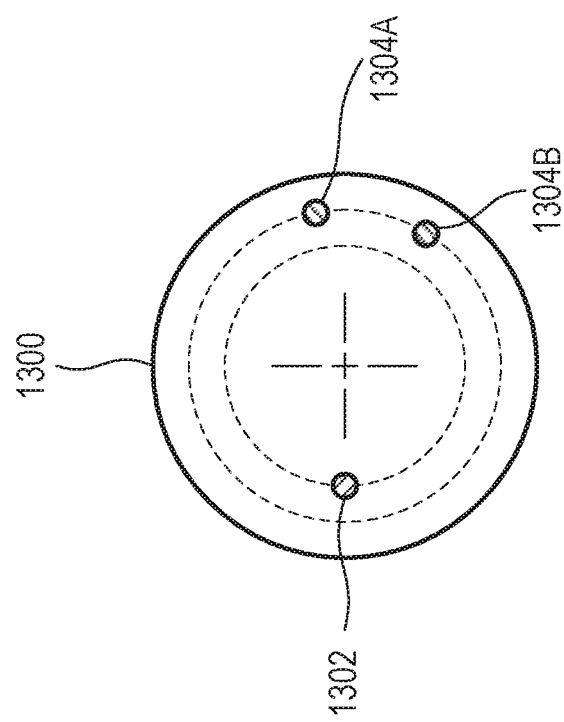
FIG. 13 is an end-on view of another example of an objective lens pupil, including a single illumination region and two collection regions, in accordance with some embodiments.

FIG. 13 is an end-on view of another example of an objective lens pupil 1300, including an illumination region 1302 and a plurality of collection regions 1304A, 1304B, in accordance with some embodiments. In the example of FIG. 13, the collection regions 1304A, 1304B are all equidistant from a central axis of the objective lens. In the example of FIG. 13, a separation between the central axis and the collection regions 1304A, 1304B is different from a separation between the central axis and at least one illumination region 1302. A confocal inspection system that uses multiple collection regions, such as 1304A and 1304B, can use the same confocal optics and detector as a confocal inspection system that uses a single collection region.

Figure 14:
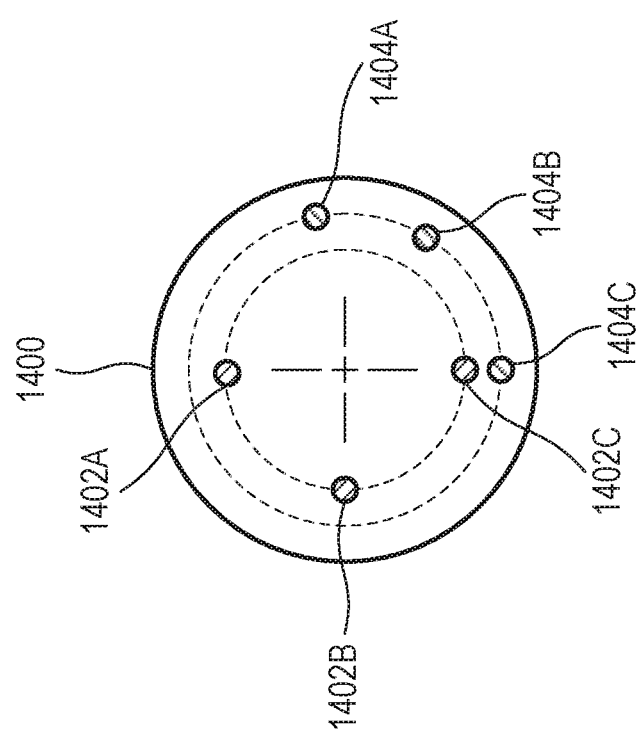
FIG. 14 is an end-on view of another example of an objective lens pupil, including multiple illumination regions and multiple collection regions, in accordance with some embodiments.

FIG. 14 is an end-on view of another example of an objective lens pupil 1400, including a plurality of illumination regions 1402A, 1402B, 1402C, and a plurality of collection regions 1404A, 1404B, 1404C, in accordance with some embodiments. In the example of FIG. 14, the illumination regions 1402A, 1402B, 1402C are all equidistant from a central axis of the objective lens. In the example of FIG. 14, the collection regions 1404A, 1404B, 1404C are all equidistant from a central axis of the objective lens. In the example of FIG. 14, a separation between the central axis and at least one collection regions 1404A, 1404B, 1404C is different from a separation between the central axis and at least one illumination region 1402A, 1402B, 1402C. In the example of FIG. 14, at least one illumination or collection region is azimuthally aligned with at least one other illumination or collection region, such as regions 1402C, 1404C. In other examples, all the illumination and collection regions are azimuthally separated.

Figure 15:
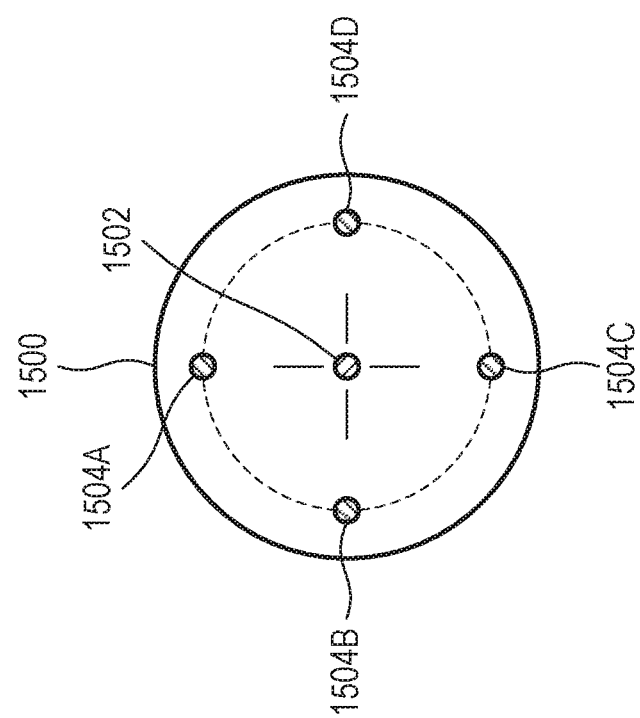
FIG. 15 is an end-on view of another example of an objective lens pupil, including a single illumination region at the center of the pupil, and multiple collection regions, in accordance with some embodiments.

FIG. 15 is an end-on view of another example of an objective lens pupil 1500, including a single illumination region 1502 at the center of the pupil, and multiple collection regions 1504A, 1504B, 1504C, 1504D, in accordance with some embodiments. In the example of FIG. 15, the collection regions 1504A, 1504B, 1504C, 1504D are evenly spaced apart azimuthally. In other examples, some or all of the collection regions 1504A, 1504B, 1504C, 1504D are azimuthally spaced unevenly.

In the examples presented thus far, the illumination and collection regions remain in fixed locations during use. The fixed regions can be implemented in hardware, such as with one or more masks located conjugate to the objective lens pupil. The masks can have transparent regions, which can transmit light therethrough. The masks can have reflective regions, which reflect light therefrom. The masks can have opaque regions, which block light from being transmitted therethrough or reflected therefrom. The masks can reflect (or transmit) the illumination region(s) to the objective lens. The masks can reflect (or transmit) the collection region(s) to the detector. The fixed regions can also be implemented in software, such as with a multi-pixel detector located conjugate to the objective lens pupil. The software can process signals corresponding to the collection region(s), and essentially ignore signals corresponding to pupil locations outside the collection region(s).

In some examples, the illumination and/or collection regions are repositionable within the objective lens pupil during use. For example, the confocal inspection system can characterize the sample at a plurality of discrete incident angles. The system can perform a measurement, then move the illumination and/or collection regions within the pupil, then perform another measurement, and so forth. In some examples, the system can step the illumination region from center of the objective lens pupil, where the system measures at normal incidence, to the edge of the objective lens pupil, where the system measures at the sine of the numerical aperture (NA) of the objective lens. In some examples, the system can iterate the wavelength as well as the incident angle. For instance, the system can scan through a range of angles at a first wavelength, then scan through the range of angles again at a second wavelength. As another example, the system can toggle between two wavelengths at each angle. In general, the system can cycle through the incident angles and wavelengths in any suitable sequence.

There are several optical configurations that can reposition the illumination and/or collection regions within the objective lens pupil. For instance, the incident optical path can include one or more pivotable mirrors, which can direct the incident beam onto a selectable location within the objective lens pupil. As another example, the incident and/or return optical paths can include one or more movable apertures, which can translate within the plane of the pupil, or within a plane conjugate to the pupil. As still another example, the incident and/or return optical paths can include a reflection from an array of micromirrors. Each micromirror can selectively pivot between a first position, at which reflected light is directed into the incident or return optical path, and a second position, at which reflected light is directed out of the incident or return optical path. The system can selectively switch the micromirrors to direct light only onto a first set of illuminating regions. The system can take a first measurement for this first set of regions. The system can then selectively switch the micromirrors to direct light only onto a second set of illuminating regions. The system can take a second measurement for this second set of regions. The system can repeat, as needed, and can similarly operate in the return optical path for the collection regions. These are but a few examples; other configurations can be used, which can reposition the illumination and/or collection regions within the objective lens pupil.

Figure 16:
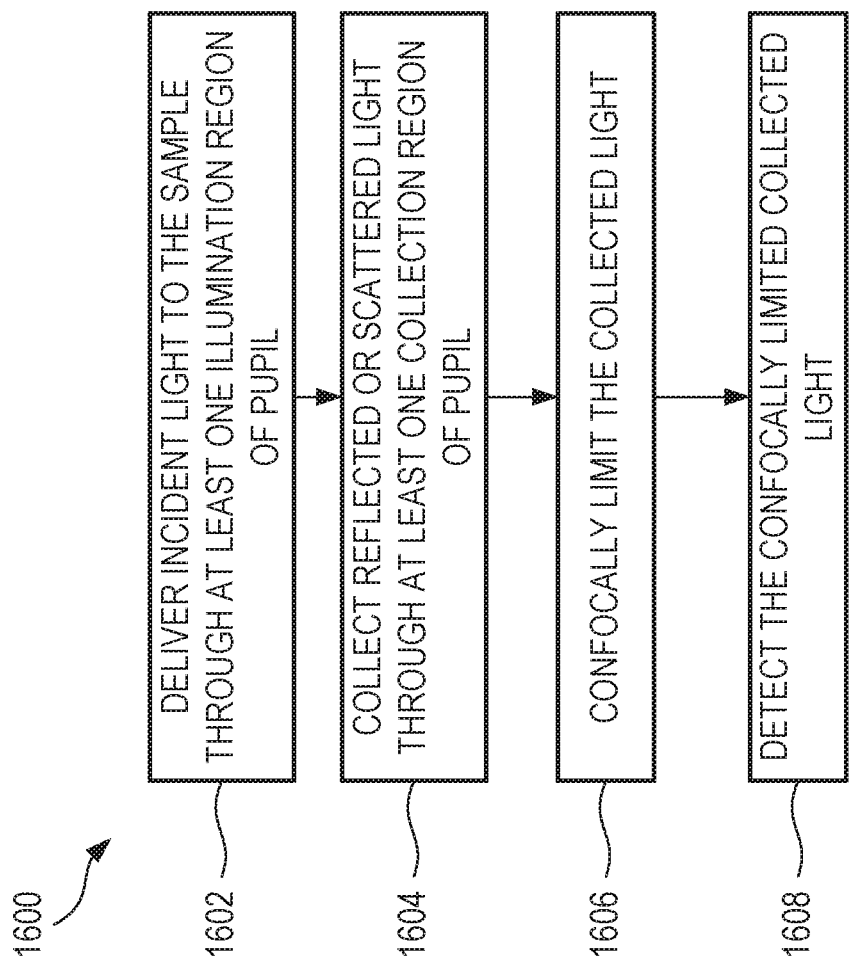
FIG. 16 is a flow chart for an example of a method for optically characterizing a sample, in accordance with some embodiments.

FIG. 16 is a flow chart for an example of a method 1600 for optically characterizing a sample, in accordance with some embodiments. The method 1600 can be executed on the confocal inspection systems above, as well as other suitable devices. Other suitable methods can also be used.

At 1602, method 1600 delivers angularly narrow incident light to the sample. The light can be delivered by an objective lens that delivers light both to and from the sample, such as 608 (FIG. 6), or by another suitable element.

At 1604, method 1600 collects angularly narrow light reflected or scattered from the sample through a collection region of a pupil of an objective lens. The light can be collected by an objective lens that delivers light both to and from the sample, such as 108 (FIG. 1), or by another suitable element. In some examples, the objective lens can collect light from more regions than just the collection region, and the light from outside the collection region can be physically blocked, such as by a mask at a suitable location, or can be excluded in software.

At 1606, method 1600 confocally limits the collected light to keep only light received from a specified depth below a surface of the sample and rejects light received from depths away from the specified depth. The collected light can be confocally limited by confocal optics, such as 612 (FIG. 6), or other suitable confocal optics. At 1608, method 1600 detects the confocally limited collected light. The light can be detected by a detector, such as 614 (FIG. 6) or other suitable single-pixel or multi-pixel detectors.

Using illumination and collection regions of the pupil, which, combined, have a surface area that is a fraction of the full pupil surface area (e.g., using angularly narrow illumination and collection), is but one technique for narrowing a range of optical path lengths traversed within the sample, which can be advantageous for absorptive or scattering samples. Other techniques are also possible.

APPENDIX

The optical properties of a particular type of sample, such as human tissue, can vary from sample-to-sample, but often fall into a well-defined range of numerical values. For instance, a scattering coefficient of a particular sample typically falls within a particular range of scattering coefficients, where the range can represent a distribution of values of the scattering coefficient for a population of samples of the same type as the particular sample. The range can be centered around a so-called expected value, such as an expected scattering coefficient. In some examples, the expected values can be used when designing a geometry for an optical inspection system, with the expectation that most actual measured values will be relatively close to, but different from, the expected value.

In an optical inspection system designed to inspect a particular type of non-transparent sample, so that light propagating through the sample scatters and/or is absorbed by the sample as it propagates, the amount of scattering and/or absorption of the sample can influence the amount of light that reaches a detector in the optical inspection system. In other words, sample-to-sample variation of a scattering and/or absorption coefficient can produce a sample-to-sample variation in the optical power reaching a detector. Such sample-to-sample variation can be undesirable, and can underutilize a full dynamic range of the detector. It is possible to design the optical inspection system to have a decreased sensitivity of detected optical power to sample-to-sample variation in scattering coefficient.

An analytical model of the optical inspection system can assume that a light ray enters the sample at an input point, scatters a single time at a scattering location, changes direction just once at the scattering location, and exits the sample at an output point. In propagating from the input point to the scattering location, an input beam is attenuated by a factor $\exp[-A(\mu_s+\mu_a)]$, where quantities $\mu_s$ and $\mu_a$ are the scattering and absorption coefficients of the sample, respectively, and quantity A is an optical path length between the input point and the scattering location. At the scattering location, a fraction $\gamma\mu_s$ of the remaining input beam is scattered towards the output, where factor $\gamma$ accounts for a scattering phase function. The light scattered toward the output location is further attenuated by an amount $\exp[-B(\mu_s+\mu_a)]$ before exiting the sample, where quantity B is an optical path length between the scattering location and the output point. A fraction of optical power exiting the sample at the output location, divided by optical power entering the sample at the input location, is given by the quantity $\gamma\mu_s \exp[-L(\mu_s+\mu_a)]$, where quantity L equals quantity A+B, and is a total optical path length traversed within the sample.

The fraction of optical power exiting the sample is relatively insensitive when its derivative equals zero, e.g., when the total optical path length traversed within the sample, L, equals an inverse of the scattering coefficient of the sample, $1/\mu_s$. When $L=1/\mu_s$, the optical power reaching the detector is maximized, which is beneficial, and is relatively insensitive to sample-to-sample variations in the amount of scattering, which is also beneficial.

To take advantage of this relative insensitivity, the optical inspection system can be designed so that a total optical path length traversed within the sample can equal, or can be relatively close to, an inverse of an expected scattering coefficient of the sample. For instance, the total optical path length traversed within the sample can be within 0.1%, within 1%, within 10%, or within 50% of an inverse of an expected scattering coefficient of the sample. Other suitable values can also be used. The expected scattering coefficient can represent a distribution of values of the scattering coefficient for a population of samples of the same type as the particular sample, such as human tissue.

The above analysis assumes a single scattering event within the sample. For geometries in which a detector element receives light that is largely due to a single high-angle scattering event, the above analysis also holds for multiple scattering events and finite positional and angular resolutions. The above analysis can also apply to confocal detection with a narrow collimated input and angularly-constrained output.

The above Detailed Description and Appendix are intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for optically characterizing a sample, comprising:
    illuminating a first lateral location with a first illuminating light from a light source;
    illuminating a second lateral location, simultaneously with the first lateral location, with a second illuminating light from the light source; confocally detecting the illuminated light that has reflected or scattered from the sample using an objective lens and confocal optics, the confocal detection including:
        transmitting the first and second illuminating light at an illumination region of the objective lens;
        receiving a first light at a collection region of the objective lens, the first light being from a specified depth at or below a surface of the sample, wherein the illumination region of the objective lens is spatially separated from the collection region of the objective lens;
        rejecting a second light using a plurality of openings in at least one component of the confocal optics, the second light being from depths away from the specified depth; and
        generating signals from the first light; and
    averaging the generated signals over the first and second lateral locations to produce a single measurement of a physical property of the sample; wherein:
    the first illuminating light and the second illuminating light have the same properties as each other; and
    the first and second lateral locations are non-contiguous and spatially separated from each other.

2. The method of claim 1, wherein the physical property is one of reflectivity, absorptivity, refractive index, density, analyte concentration, scattering coefficient, or scattering anisotropy.

3. A confocal inspection system for optically characterizing a sample, comprising:
    a light source;
    an optical subsystem configured to:
        simultaneously deliver incident light from the light source to a plurality of lateral locations at the sample, the incident light having the same properties, wherein at least two lateral locations of the plurality of lateral locations are non-contiguous and spatially separated from each other, and
        collect the incident light that has reflected or scattered from the sample, the collected light including first light and second light,
    the optical subsystem including an objective lens, the objective lens including an illumination region and a collection region, the illumination region spatially separated from the collection region, the objective lens configured to:
        transmit the incident light at the illumination region of the objective lens, and
        receive the first light at the collection region of the objective lens, the first light being from a specified depth at or below a surface of the sample;
    confocal optics and a detector configured to:
        reject the second light using a plurality of openings in at least one component of the confocal optics, the second light being from depths away from the specified depth, and
        generate signals from the first light,
        wherein the detector produces at least one pixel signal in response to the first light directed thereon; and
    a computer configured to:
        form a single electrical signal by averaging the at least one pixel signal over the plurality of lateral locations, and
        produce a single measurement of a physical property of the sample in response to the single electrical signal.

4. The confocal inspection system of claim 3, wherein the at least one component of the confocal optics includes an opaque screen, wherein the plurality of openings include a plurality of spaced-apart confocal apertures therethrough corresponding to the plurality of lateral locations at the sample, the opaque screen and the optical subsystem being positioned so that the opaque screen is conjugate to the specified depth.

5. The confocal inspection system of claim 3, wherein the detector is a single-pixel detector producing a single pixel signal.

6. The confocal inspection system of claim 3, wherein the detector is a multi-pixel detector producing a plurality of pixel signals; and
    wherein the computer is configured to form the single electrical signal by averaging the plurality of pixel signals.

7. The confocal inspection system of claim 3, wherein the objective lens is a single objective lens.

8. The confocal inspection system of claim 3, wherein the optical subsystem includes separate incident and return lenses for delivering light to the sample and collecting light from the sample, respectively.

9. The confocal inspection system of claim 3, wherein the physical property is one of reflectivity, absorptivity, refractive index, density, or analyte concentration.

10. A confocal inspection system for optically characterizing a sample, comprising:
    an illuminator configured to simultaneously illuminate a plurality of lateral locations incident on the sample with light having the same properties, wherein at least two lateral locations of the plurality of lateral locations are non-contiguous and spatially separated from each other;
an objective lens configured to:
  transmit the simultaneous illumination at an illumination region of the objective lens,
  collect the incident light that has reflected or scattered from the sample at a collection region of the objective lens and direct the collected light onto a detector, the collected light including first light and second light, wherein the illumination region of the objective lens is spatially separated from the collection region of the objective lens;
a confocal collector and the detector configured to:
  generate signals from the first light, the first light being from a specified depth at or below a surface of the sample, and
  reject signals from the second light using a plurality of openings in at least one component of the confocal collector, the second light being from depths away from the specified depth; and
a computer configured to:
  retrieve a plurality of electrical signals from the detector, each electrical signal corresponding to a different lateral position at the sample; and
  average the retrieved electrical signals to produce a single measurement of a physical property of the sample.

11. The confocal inspection system of claim 10, wherein the illuminator further comprises:
  a light source configured to produce the incident light for illuminating the sample;
  a pivotable mirror configured to reflect the incident light at a selectable reflected angle; and
  the objective lens, the objective lens further configured to receive the reflected incident light at the selectable reflected angle and direct the reflected incident light onto the sample at a lateral location that corresponds to the selectable reflected angle; and
wherein the confocal collector further comprises:
  the objective lens;
  the pivotable mirror, which is further configured to reflect the collected light; and
  confocal optics, the confocal optics including an opaque screen located conjugate to the specified depth, the opaque screen being the at least one component and the plurality of openings including an aperture, the aperture sized to transmit the first light reflected or scattered from the specified depth and block the second light reflected or scattered at depths away from the specified depth.

12. The confocal inspection system of claim 10, wherein the illuminator further comprises:
  a light source configured to produce the incident light for illuminating the sample; and
  the objective lens configured to direct the incident light onto the sample simultaneously at the plurality of lateral locations; and
wherein the confocal collector further comprises:
  the objective lens; and
  confocal optics, the confocal optics including an opaque screen located conjugate to the specified depth, the opaque screen being the at least one component, each aperture located to transmit the first light from a respective lateral location at the sample, each aperture sized to transmit the first light reflected or scattered from the specified depth and block the second light reflected or scattered at depths away from the specified depth.

13. The confocal inspection system of claim 10, wherein the illuminator further comprises:
  a micromirror array, each micromirror in the micromirror array having a controllable effective reflectivity, the computer including driving electronics to drive the micromirror array;
  the objective lens, wherein the objective lens is disposed between the micromirror array and the sample, the objective lens and the micromirror array being positioned so that each micromirror in the micromirror array is imaged onto a corresponding lateral location at the specified depth at or below a surface of the sample; and
  a light source producing the incident light beam along an incident optical path, the incident optical path extending from the light source to the micromirror array to the objective lens to the sample, the incident light beam simultaneously illuminating the micromirrors in the micromirror array; and
wherein the confocal collector further comprises:
  the objective lens; and
  the micromirror array, which is further configured to reflect the collected light.

14. The confocal inspection system of claim 10, wherein the detector is a single-pixel detector producing a single-pixel signal, and the confocal collector simultaneously detects the collected light on the single-pixel detector.

15. The confocal inspection system of claim 10,
wherein the detector is a multi-pixel detector;
wherein the confocal collector simultaneously detects the collected light on the multi-pixel detector; and
wherein the computer combines the electrical signals arising from the detector pixels.

* * * * *

UNITED STATES PATENT AND TRADEMARK OFFICE
CERTIFICATE OF CORRECTION

PATENT NO. : 10,718,931 B2
APPLICATION NO. : 15/529451
DATED : July 21, 2020
INVENTOR(S) : Mark Alan Arbore et al.

Page 1 of 1

It is certified that error appears in the above-identified patent and that said Letters Patent is hereby corrected as shown below:

In the Claims

Claim 1, Column 19, Line 41:
"illuminated light that has reflected or scattered from the"
Should read as follows:
--first and second illuminated light that has reflected or scattered from the--

Claim 15, Column 22, Line 50:
"wherein the computer combines the electrical signals"
Should read as follows:
--wherein the computer combines the plurality of electrical signals--

Signed and Sealed this
Twenty-ninth Day of September, 2020

Andrei Iancu
*Director of the United States Patent and Trademark Office*